United States Patent Office 2,928,628
Patented Mar. 15, 1960

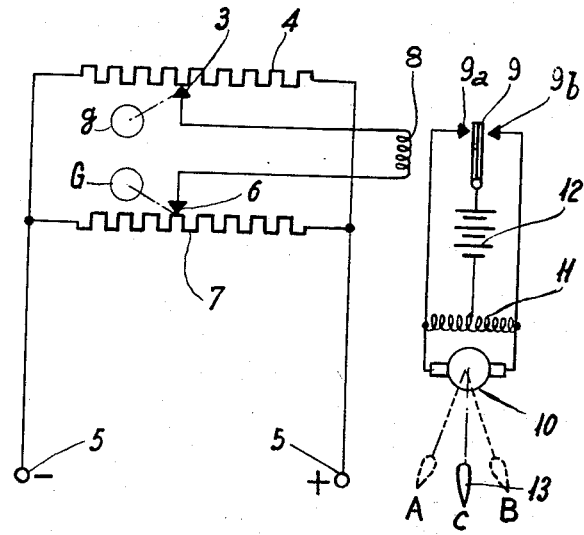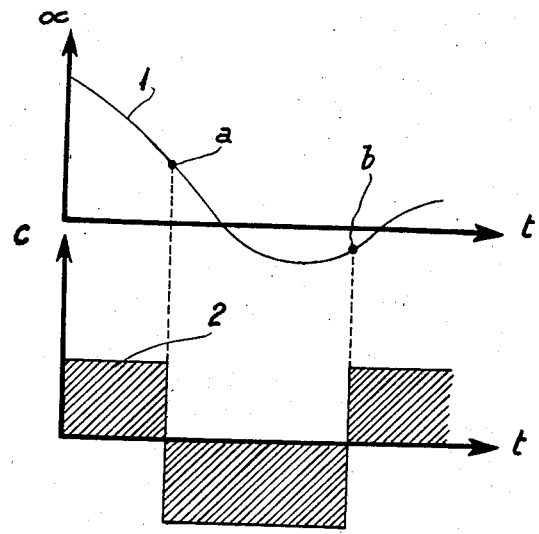

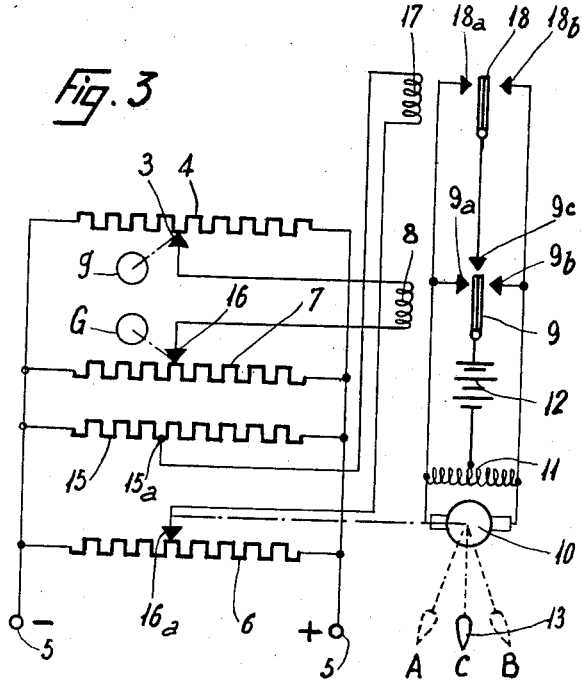
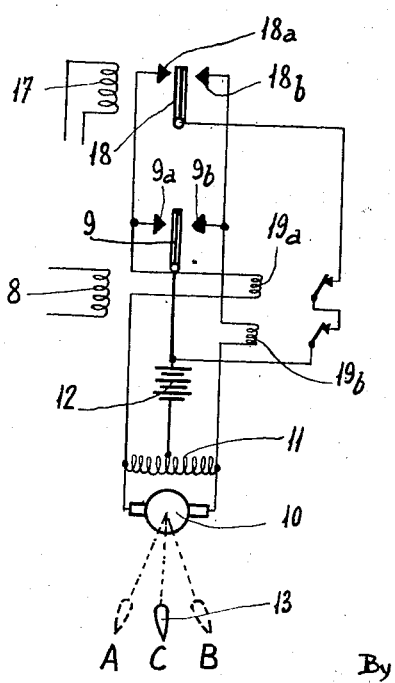

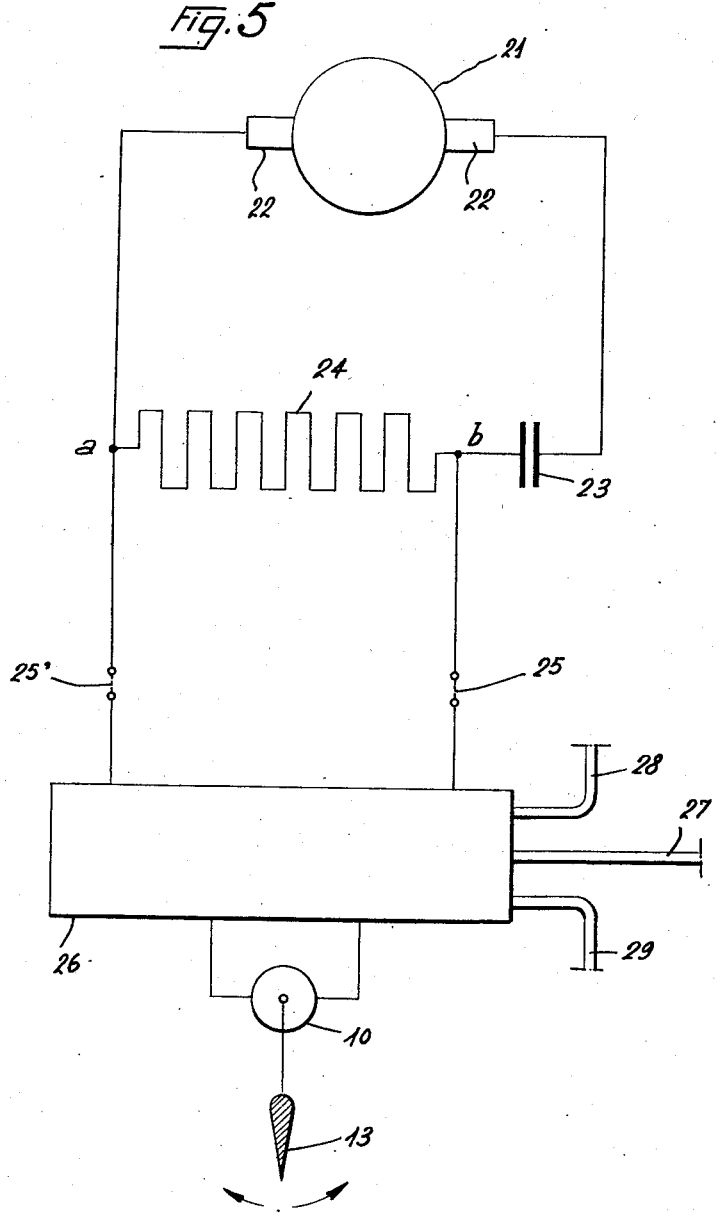

2,928,628

STABILIZATION DEVICE OF AERODYNES EQUIPPED WITH ROTARY POWER PLANTS

Günther Ernst, Dammarie-les-Lys, France, assignor to Societe Nationale d'Etude et de Construction de Moteurs d'Aviation, Paris, France, a French company Application August 8, 1955, Serial No. 527,107

Claims priority, application France August 10, 1954

6 Claims. (Cl. 244—77)

Aircraft and other aerodynes equipped with turbo-jet or turbo-prop engines are subject to rolling torques when the rotative speed of the rotary power plant is varying. Those disturbing torques, not very sensitive at high flight speeds of aircraft, bcome very inconvenient at low speeds and especially at zero speeds, which is the case when taking off or landing vertically for aircraft designed for that purpose. In particular, to land vertically, the pilot must make alternate maneuvers in order to modify the thrust by increasing or decreasing successively the propeller rotative speed. Hence strong oscillations of the aircraft occur about the rolling axis, that is to say about its longitudinal axis of symmetry, which is the more detrimental as the landing maneuver is usually very delicate.

The main object of the present invention is to reduce and possibly to cancel those disturbing causes by generating, through adequate control means, a counter-torque opposed to the rolling torque exerted by the turbo-engine. Said control means can be advantageously of the kind described in the U.S. patent application Serial No. 384,-204, filed October 5, 1953, but it is understood that my present invention applies to any kind of control device able to produce a counter-torque about the rolling axis of the aircraft.

According to the present invention the stabilization device comprises means of detection of a suitably selected factor, such as the aircraft angle of roll and/or the velocity of variation of this angle, for instance by means of a gyroscope and/or by means of a gyrometer suitable for acting upon the control means according to the value of the detected factor. The latter can be the ratio of the angle of roll to the velocity of variation of this angle, the action on to the said control means being reversed every time this ratio reaches a definite value.

The following description along with the attached drawing, given as a non-restrictive example, will make apparent how said invention can be achieved.

Figure 1 shows the variation of the angle of roll and of the counter-torque exerted by the control means.

Figure 2 is a diagram of an embodiment of my invention.

Figure 3 shows an improvement to this embodiment.

Figures 4 and 5 show other embodiments.

As it has been explained above, the angular position of an aircraft with respect to its longitudinal axis of symmetry varies at each variation of the rotation speed of the power plant to vary the thrust produced for instance when the aircraft is landing vertically.

Curve 1 of Figure 1 shows the variation of the angle of roll α of the aircraft with time t.

This curve passes through points a, b at which the ratio of the angle of roll (given by the ordinate of these points) to the rate of variation of this angle (given by the tangent at these points) is equal to a predetermined value, a short instant before the angle of roll reaches zero.

According to the present invention, a constant counter-torque C designed to counteract the rolling effect is produced through adequate control means, this counter-torque being reversed every time curve 1 passes through points such as a and b as shown in diagram 2.

In accordance with this invention, that action is obtained by means of a gyroscope shown diagrammatically at g (Figure 2) detecting the value of the angle of roll, that is to say, the ordinate of the points of curve 1 and by a gyrometer or rate gyroscope shown diagrammatically at G detecting the rate of variation of this angle of roll, that is to say, the tangent at the various points of that curve.

The gyroscope g drives the slider 3 of a potentiometer 4 connected across the terminals 5—5 of a D.C. source, whereas gyrometer G drives the slider 6 of a potentiometer 7 also connected across the terminals of this D.C. source. Thus, the positions of the sliders 3 and 6 depend on the angle of roll and its rate of variation.

The potentiometers 4 and 7 belong to a Wheatstone's bridge the diagonal or cross branch of which ends at the sliders 3 and 6. That diagonal includes the energizing coil 8 of a polarized relay controlling a two-position switch 9. A jack or electrical motor 10 having a shunt winding 11 is connected between the fixed contacts 9a—9b, whereas the movable contact 9 is connected to a median point of winding 11 through a battery 12. Jack 10 operates the control system, shown diagrammatically at 13 and which may be of the type having pivotal vanes placed at the exhaust of the turbine, as described in the above mentioned U.S. patent application Serial No. 384,204.

The Wheatstone bridge is so adjusted that it is balanced when sliders 3 and 4 are in relative positions corresponding to points such as a and b of curve 1. For any other point on this curve, the bridge is unbalanced and coil 8 is energized. According to the direction of the disequilibrium current, the switch 9 closes one of the two feed circuits of jack 10—11, so that the latter rotates in the corresponding direction and accordingly actuates the control means 13, to generate a positive or negative counter-torque as shown in diagram 2 of Figure 1.

The jack 10 has two stable positions which correspond respectively to the two positions 9a and 9b of switch 9 and to two positions of the control means shown diagrammatically at A and B. The control system which is associated with jack 10 produces equal but opposite counter torques, according to the position of the jack and therefore of the switch 9.

A counter-torque is obtained whenever the ratio: angle of roll to rate of variation of this angle, is equal to a predetermined value. The result is that the disturbing rolling effect is reduced and quickly vanishes.

In the embodiment which has just been described the jack 10—11 is, at rest, in either of its operative positions A and B; this gives rise to a detrimental residual oscillation even in the absence of any rolling effect to be counteracted.

The arrangement shown in Figure 3 avoids such a drawback. The same elements as in Figure 2 are used in this arrangement; however the relay 8—9 is in this case a three-position relay. The third position 9c of this relay is reached when coil 8 is not energized, that is to say, when the bridge is balanced. In this position the switch 9 of the three-position relay closes an auxiliary electrical circuit for the control of jack 10—11, causing the control means 13 to return to neutral position C at which no counter-torque is produced.

This auxiliary circuit comprises a second Wheatstone bridge the potentiometers 15 and 16 of which are connected across the terminals 5—5 and a coil 1F inserted into the diagonal branch of the bridge, between a fixed point 15a and a slider 16a. The coil 17 belongs to a polarized relay the switch 18 of which cooperates with two fixed contacts 18a—18b connected to the terminals of jack 10—11; the movable contact 18 is connected to contact 9c. Slider 16a is moved by the jack together with the control means 13.

Point 15a is selected so that the bridge 15—16 is balanced when slider 16a is in a position corresponding to the neutral position C of the control means 13. For any other position of jack 10—11, bridge 15—16 is unbalanced and coil 17 is energized. Switch 18 is set on contact 18a or 18b according to the direction of the disequilibrium current flowing through coil 17 and jack 10 moves in the direction returning slider 16a back to the balance position, and therefore the control means 13 back to neutral position C. At this moment coil 17 is no longer energized and switch 18 separates from its fixed contacts, thus opening the circuit of jack 10, at the instant the control means reach C. Of course, this return circuit operates only if the switch 9 is on the third position 9c, that is to say, when the bridge 4—7 is balanced.

Of course, a three-position relay such as that of Figure 3 is not absolutely necessary; the reversing device of Figure 2 can be adapted to perform the same action merely by using relays having coils 19a and 19b (Figure 4) in series with the fixed contacts 9a and 9b, the contacts of both these relays being arranged in series with the movable contact 18. Therefore, voltage is only applied to 18 when both contacts 19a, 19b are closed.

In the embodiment of Figure 5, the rotor or armature 21 of a D.C. generator is driven from the gas turbine shaft. Brushes 22 of the generator are connected to the plates of a condenser 23 through a resistor 24. It may be shown that the voltage between the terminals $a$ and $b$ of the resistor 24 is equal to $$KRC \frac{dw}{dt}$$

K being a constant, R the value of the resistor 24, C the capacity of the condenser 23 and $w$ the angular velocity of the generator $$\frac{dw}{dt}$$

being a function of the torque which produces rolling. Terminals $a$ and $b$ are connected through filters 25, 25' to the input terminals of an amplifier 26 the output terminals of which are connected to an electrical jack 10 actuating the corrective control means 13. Of course, the amplifier 26 is of a type such that the output current supplied to the jack 10 is proportional to the voltage between the terminals $a$ and $b$ and flows in a direction corresponding to the sign of this voltage (acceleration or deceleration). The jack 10 moves the control means 13 in either direction according to the current supplied to it, so that a torque opposite to the detected rolling torque is exerted on the aircraft. The jack 10 is provided with a return arrangement of a type used in the art of regulation. The amplifier 26 can be connected to a manual control circuit 27. It is also possible to connect the amplifier to circuits 28—29, including a gyroscope and gyrometer as described above.

What I claim is:

1. In a vertical take-off and landing aircraft powered by a rotary power plant, a device for compensating rolling torques exerted on said aircraft upon variation of the rotation speed of said power plant during take-off and landing, comprising controls selectively producing on said aircraft a rolling torque in one direction or the other, a gyroscope which detects the angular magnitude of any displacement of said aircraft about the roll axis thereof upon variation of the rotation speed of said power plant, a rate-of-turn gyroscope which detects the angular velocity of said displacement, interconnecting signal generating means between said gyroscopes which is sensitive to the ratio of the values detected thereby and which generates a signal whose sign depends on whether said ratio is above or below a prescribed value, and means for actuating said controls in one direction or the other in response to the sign of said signal.

2. Device as claimed in claim 1, wherein the interconnecting signal generating means is an electrical network comprising two potentiometers in a Wheatstone bridge arrangement, having sliders connected across a diagonal arm of said bridge and respectively driven by the gyroscope and rate-of-turn gyroscope, said bridge being so adjusted that no-current balance is reached whenever the ratio of the values detected by the gyroscopes is equal to the prescribed value.

3. Device as claimed in claim 2, wherein the controls actuating means comprises a polarized relay having an energizing coil inserted in the diagonal arm of the Wheatstone bridge, and an electrical servo-motor driving the roll controls in one direction or the other in accordance with the operative position of said polarized relay.

4. Device as claimed in claim 3, wherein the servo-motor has but two opposite stable positions corresponding to equal and opposite torques produced by the roll controls.

5. Device as claimed in claim 3, wherein the polarized relay has a three-position switch; two opposite extreme positions corresponding to energizing current of opposite signs flowing through the energizing coil and a neutral intermediate position corresponding to no-current in said coil.

6. Device as claimed in claim 5, wherein the servo-motor has three different stable positions; two extreme positions corresponding to equal and opposite torques produced by the roll controls and an intermediate position corresponding to no torque, the positions of the relay switch and servo-motor being interrelated.

References Cited in the file of this patent

UNITED STATES PATENTS

| | | |
|---|---|---|
| 2,057,877 | Bragunier | Oct. 20, 1936 |
| 2,167,533 | Solomon | July 25, 1939 |
| 2,201,226 | Carlson | May 21, 1940 |
| 2,735,051 | Gille | Feb. 14, 1956 |
| 2,770,428 | Vogel | Nov. 13, 1956 |